UNITED STATES PATENT OFFICE.

CHARLES Y. BEACH, OF BROOKLYN, NEW YORK.

IMPROVEMENT IN THE MANUFACTURE OF BONE-BLACK.

Specification forming part of Letters Patent No. 119,005, dated September 19, 1871.

*To all whom it may concern:*

Be it known that I, CHARLES Y. BEACH, of Brooklyn, in the county of Kings and State of New York, have invented a new and useful improvement in the treatment of bones and other animal substances for the production of bone-black or animal charcoal and for obtaining other products; and I do hereby declare that the following is a full, clear, and exact description of the same.

My invention, for the production of animal charcoal or for obtaining ammonia and other products, consists in exposing the bones or other animal substances to be treated to the direct action of burning gases instead of inclosing the bones, as heretofore practiced, in covered pots exposed to the action of the fire. By my improved process I am enabled to carbonize the mass much more perfectly and with less waste than under the process heretofore adopted, inasmuch as by allowing the reducing gases to circulate among the mass there is an equal exposure of the bones throughout to the heat and carbonizing action of the gases; whereas by treating the bones in closed pots exposed only externally to the action of the fire the outside and inside portions of the mass are necessarily very unequally carbonized.

My improvement may be put into practice in any furnace in which the gases are generated from the fuel in a separate chamber and afterward burned in contact with the bones or other substances, or passed in a heated state in contact therewith, as, for instance, in a modification of the Siemen's furnace, or in a reverberatory furnace heated by gases, or in any other gas-burning furnace in which the burning or heated gases may be passed directly through or in contact with the bones or substances.

When it is desired to collect ammonia or other products passing off with gas or gases, then it will be necessary to condense the latter as they come from the furnace.

What is here claimed, and desired to be secured by Letters Patent, is—

The treatment of bones or other animal substances, for the purpose or purposes herein specified, by direct exposure of them to burning gases or heated gaseous products of combustion, substantially as herein set forth.

CHAS. Y. BEACH.

Witnesses:
FRED HAYNES,
HENRY T. BROWN. (108.)